(12) United States Patent
Mahindru et al.

(10) Patent No.: US 10,360,077 B2
(45) Date of Patent: Jul. 23, 2019

(54) MEASURING UTILIZATION OF RESOURCES IN DATACENTERS

(71) Applicant: INTERNATIONAL BUSINESS MACHINES CORPORATION, Armonk, NY (US)

(72) Inventors: Ruchi Mahindru, Elmsford, NY (US); John A. Bivens, Ossining, NY (US); Koushik K. Das, Yorktown Heights, NY (US); Min Li, San Jose, CA (US); HariGovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 300 days.

(21) Appl. No.: 15/289,281

(22) Filed: Oct. 10, 2016

(65) Prior Publication Data
US 2018/0101415 A1 Apr. 12, 2018

(51) Int. Cl.
*G06F 9/455* (2018.01)
*G06F 9/50* (2006.01)
*G06F 11/30* (2006.01)

(52) U.S. Cl.
CPC ........ *G06F 9/5094* (2013.01); *G06F 9/45558* (2013.01); *G06F 11/3006* (2013.01);
(Continued)

(58) Field of Classification Search
None
See application file for complete search history.

(56) References Cited

U.S. PATENT DOCUMENTS 7,003,441 B2 * 2/2006 Venkitakrishnan ....... G06F 1/26
703/13
7,783,907 B2 8/2010 Dubinsky
(Continued)

FOREIGN PATENT DOCUMENTS

CN 104715340 A1 6/2015

OTHER PUBLICATIONS

Zhao et al. "Virtual Machine Power Metering and Provisioning" Microsoft Research, Jun. 11, 2010 (Zhao_2010.pdf; pp. 1-12) (Year: 2010).*

(Continued)

*Primary Examiner* — Hiren P Patel
(74) *Attorney, Agent, or Firm* — Griffiths & Seaton PLLC

(57) ABSTRACT

For measuring component utilization in a computing system, a server energy utilization reading of a statistical significant number of servers out of a total number of servers located in the datacenter is obtained by measuring, at predetermined intervals, a collective energy consumed by all processing components within each server. The collective energy is measured by virtually probing thereby monitoring an energy consumption of individual ones of all the processing components to each collect an individual energy utilization reading, where the individual energy utilization reading is aggregated over a predetermined time period to collect an energy consumption pattern associated with the server utilization reading.

12 Claims, 6 Drawing Sheets

(52) U.S. Cl.
CPC ...... *G06F 11/3037* (2013.01); *G06F 11/3051* (2013.01); *G06F 11/3089* (2013.01); *G06F 2009/45575* (2013.01); *G06F 2009/45591* (2013.01); *G06F 2009/45595* (2013.01); *Y02D 10/22* (2018.01)

(56) References Cited

U.S. PATENT DOCUMENTS

| | | | |
|---|---|---|---|
| 9,235,252 B2 * | 1/2016 | Shrall | G06F 1/3206 |
| 9,477,279 B1 | 10/2016 | Piszczek et al. | |
| 9,557,792 B1 | 1/2017 | Potlapally | |
| 9,915,989 B2 * | 3/2018 | Matteson | G06F 1/26 |
| 9,939,834 B2 * | 4/2018 | Bodas | G05B 15/02 |
| 9,946,815 B1 | 4/2018 | Weber | |
| 2004/0054938 A1 * | 3/2004 | Belady | G06F 1/3203 713/300 |
| 2005/0102539 A1 | 5/2005 | Hepner et al. | |
| 2006/0031180 A1 | 2/2006 | Tamarkin | |
| 2009/0144566 A1 | 6/2009 | Bletsch et al. | |
| 2009/0254660 A1 | 10/2009 | Hanson | |
| 2009/0293022 A1 * | 11/2009 | Fries | G06F 1/206 716/132 |
| 2010/0211810 A1 | 8/2010 | Zacho | |
| 2010/0313203 A1 | 12/2010 | Dawson et al. | |
| 2011/0213997 A1 * | 9/2011 | Kansal | G06F 1/3203 713/324 |
| 2012/0078430 A1 | 3/2012 | Fan et al. | |
| 2012/0290865 A1 | 11/2012 | Kansal et al. | |
| 2014/0149761 A1 * | 5/2014 | Allen-Ware | G06F 1/3234 713/320 |
| 2014/0215241 A1 * | 7/2014 | Yoon | G06F 1/324 713/322 |
| 2014/0365795 A1 | 12/2014 | Nielson et al. | |
| 2015/0006940 A1 * | 1/2015 | Kim | G06F 1/26 713/340 |
| 2015/0058845 A1 | 2/2015 | Song et al. | |
| 2015/0106811 A1 | 4/2015 | Holler et al. | |
| 2015/0363132 A1 | 12/2015 | Uehara | |
| 2016/0054783 A1 * | 2/2016 | Rajappa | G06F 1/3203 700/291 |
| 2016/0091948 A1 * | 3/2016 | Mitchell | G06F 1/3206 713/340 |
| 2017/0017288 A1 * | 1/2017 | Bose | G06F 1/3287 |
| 2017/0070567 A1 * | 3/2017 | Lee | H04L 67/1008 |
| 2017/0083077 A1 * | 3/2017 | Hankendi | G06F 1/3287 |
| 2017/0185132 A1 | 6/2017 | Bodas et al. | |
| 2017/0195408 A1 * | 7/2017 | Wu | H04L 47/70 |
| 2017/0255240 A1 * | 9/2017 | Matteson | G06F 1/26 |
| 2017/0322241 A1 * | 11/2017 | Tang | H02J 3/00 |
| 2017/0329649 A1 * | 11/2017 | Cudak | G06F 9/5088 |
| 2017/0366412 A1 | 12/2017 | Piga | |
| 2018/0101415 A1 * | 4/2018 | Mahindru | G06F 9/5094 |
| 2018/0232113 A1 * | 8/2018 | Ham | G06F 15/16 |

OTHER PUBLICATIONS

List of IBM Patents or Patent Applications Treated as Related dated Oct. 11, 2016 (2 pages).

* cited by examiner

600

| PRIORITY | CRITICAL SLA | OPPORTUNISTIC SLA |
|---|---|---|
| PREDICTABLE | 1ST | 3RD |
| ERRATIC | 2ND | 4TH |

MEASURING UTILIZATION OF RESOURCES IN DATACENTERS

CROSS-REFERENCE TO RELATED APPLICATIONS

This Application is related to the following five Applications having U.S. application Ser. Nos. 15/289,272, 15/289,274, 15/289,276, 15/289,280, and 15/289,284, each filed on even date as the present Application.

BACKGROUND OF THE INVENTION

Field of the Invention

The present invention relates generally to large scale computing, and more particularly measuring computing component utilization in a distributed computing environment.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. A fundamental need exists to enhance the underlying systems and infrastructure which support and maintain this fast-growing industry.

SUMMARY OF THE INVENTION

Various embodiments for measuring component utilization in a computing system, by a processor device, are provided. In one embodiment, a method comprises obtaining a server energy utilization reading of a statistical significant number of servers out of a total number of servers located in the datacenter by measuring, at predetermined intervals, a collective energy consumed by all processing components within each server; and measuring the collective energy by virtually probing thereby monitoring an energy consumption of individual ones of all the processing components to each collect an individual energy utilization reading; wherein the individual energy utilization reading is aggregated over a predetermined time period to collect an energy consumption pattern associated with the server utilization reading.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a chart diagram illustrating a priority schedule for power management in a disaggregated computing system, in accordance with aspects of the present invention.

DETAILED DESCRIPTION OF THE DRAWINGS

Figure 1:
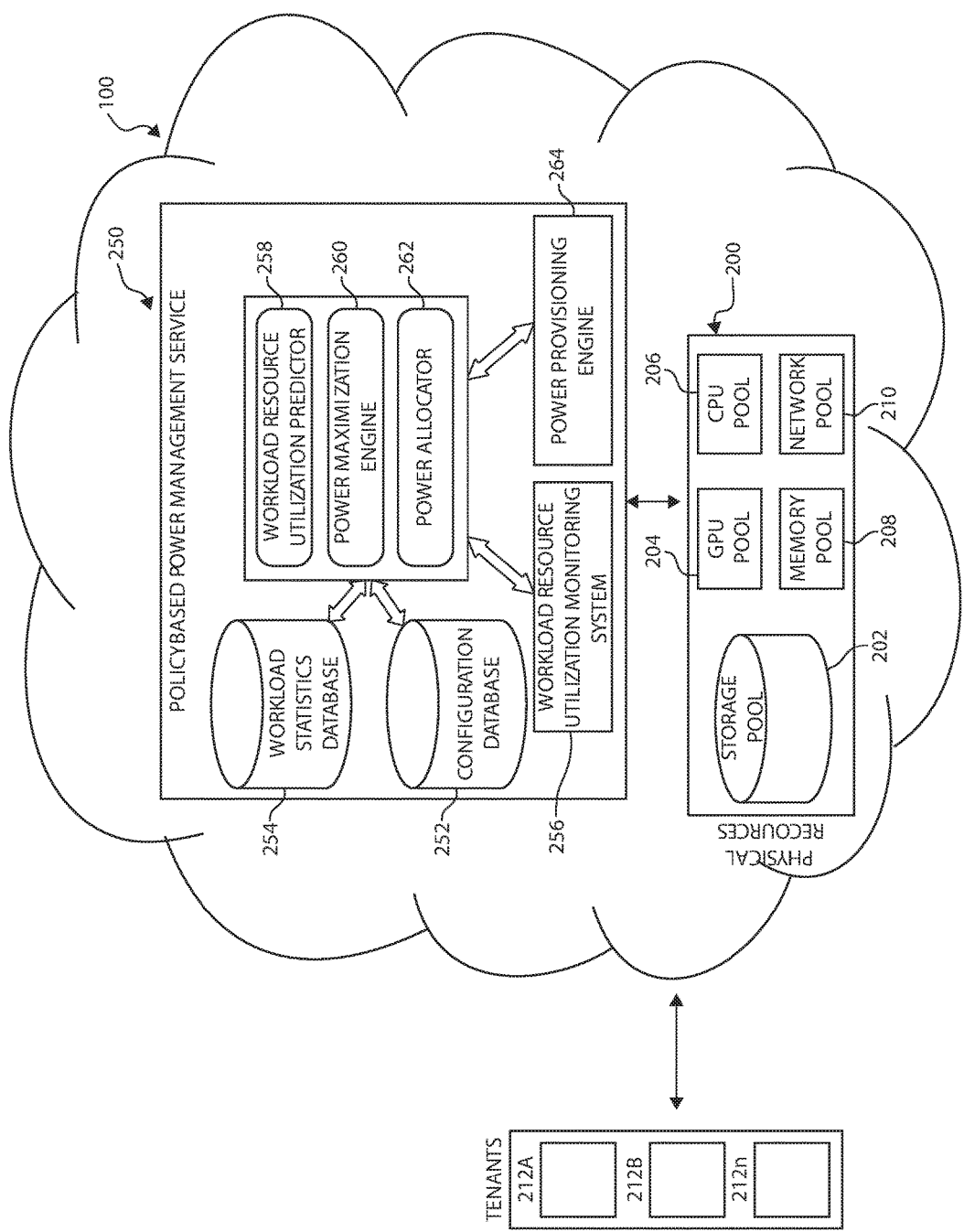
FIG. 1 is a block diagram illustrating a hardware structure of a disaggregated computing environment, in which aspects of the present invention may be realized.

Computing resources are usually pre-configured by vendors at fixed levels of configurations. One aspect is that each individual computing resource, such as memory size, number of CPUs, disk size, etc. has a limited boundary. Another aspect is that each computing platform has a limited number of physical customization options. Today's workloads are running under these limitations, which subsequently is a reason that techniques such as memory swapping and caching optimization are used in computing environments.

The emergence of cloud computing changes the paradigm of how people utilize computing resources by providing a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

The underlying architecture of the Infrastructure as a Service (IaaS) cloud is generally traditional hardware used in data centers as described above. Users either access the hardware directly, or access virtual machines contained thereon. However, because of the fixed nature of building servers as enclosures that are configured once, when the enclosure is built, the fundamental architecture underneath the data center is very rigid and inflexible. It is thus the cloud software that provides the emulation to create the flexible, on-demand functionality that cloud services are known for. This functionality is quite limited however, as many mechanisms depend on software relying on server enclosures, which architectures originated early in the Personal Computer era, turning into an on-demand service.

The Virtual Machine (VM) is a software technique based on an entity that runs on a part of a server, possibly with other such entities sharing the same server. It represents the unit of on-demand computation, where each such entity is designated with a pre-defined number of virtual CPUs and memory. Once defined, a VM cannot change its base resources, such as adding memory or adding virtual CPUs. This is because such a VM shares the hardware resources of a fixed pre-built server enclosure with other VMs, and it may not be possible to displace other users to make room for the resource expansion of the first user. While such is possible in principle (e.g. by migrating other users (live VM migration) to other servers), such an operation would create an abundant increase in traffic and require an overload on a datacenter network. In addition, the provisioning of new VMs on-demand can take an impractical amount of time, relatively speaking (e.g. minutes, while real-world events may require a response to events in sub-second times). Thus the notion of true, real-world and corresponding on-demand cloud infrastructure does not exist. This situation may force users to provision resources for worse-case needs (max processor number/speed, max memory) and to keep VMs even if unneeded, only to be able to respond to real-world events in relative time.

For cloud services achieved via Application Program Interfaces (APIs), users do not access the operating system directly, but rather issue requests via the APIs. The computation is then handled by the underlying operating system and hardware infrastructure. Some vendors provide a certain level of scaling and elasticity that are transparent to user APIs. However, the level of scaling is limited by the type of application and by the capacity of the individual computing resource. For example, if a workload requires a high demand of memory usage, it is not possible to scale up on memory size individually. Therefore, the overall resource utilization is poor and this solution is not cost-effective either.

In view of the forgoing, disaggregated computing systems provide flexibility and elasticity in constructing bare-metal computing systems for use in the cloud, to provide on-demand flexibility to cloud users, or "tenants". A disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system, such that workloads are computed based on hardware resource configurations that are most suitable for the respective workload. In one embodiment, for example, a system may be constructed with an extremely high capability of memory size but with a more moderate capacity of CPU and other resources, for a memory-intensive workload.

Within these disaggregated systems, various application-level service level agreements (SLAs) may be employed to dynamically provision the hardware resources on-demand, and ensure that a tenant is receiving the computing service they have purchased, while retaining an overall cost and performance efficiency model for both the cloud service provider and the tenant.

Power Management in Disaggregated Systems

From an electrical power utilization perspective, modern data center operations have the following two desirable goals. First, in modern data centers, it is desirable to run the resident systems as close to 100% component utilization as possible due to the large capital investment in the servers, racks, cables, and storage, as well as the software licensing costs integrated in such systems, etc. Therefore, powering down equipment (i.e. hibernate or sleep mode) is not desirable, as it would mean all the invested capital of the hardware and software licenses associated with such is wasted.

Second, given a range of electrical power allocated (contracted) from the utility company for a datacenter, it is highly desirable to operate within that allocated (contracted) power range with some small variance (e.g. +/−5% within the allocated power). Power is a valuable resource and utility companies have limited total power they can generate and carry over the power grid to supply. Utility companies cannot quickly adjust the generation of power to match fast and large fluctuations of power consumed. Therefore, it is imperative that a certain range of power usage that is contracted, be consumed by the data center. Utility companies need to balance electrical power generation with power consumption because their generators can adjust to periodic demands but cannot adjust for these large erratic power usage changes. When the datacenter erratically underutilizes the contracted power, the utility company may have to burn the extra power generated so that they do not damage their generators. Consequently, utility power supply contracts may stipulate that large variations in power usage by a customer (e.g., a datacenter operator) may lead to costly penalties in form of additional charges. Hence, it is not always beneficial to quickly move into sleep mode and save power only to quickly move back to need to use that power again.

There are significant performance, throughput, utilization, and cost benefits if the combination of the above two goals can be realized, where the beneficiary parties include the utility companies (cost benefits), data center/cloud provider (performance, utilization, and cost benefits), and end user/cloud customer (performance, throughput, and cost benefits). Realizing the combination of the two goals would help simultaneously increase utilization of hardware resources, performance and throughput of user workloads, while operating within the allocated power range, resulting in lower costs for the utility company, data center provider, and end user.

Based on the above two considerations, the present invention considers the problem of managing electrical power allocation to the processing cores based on the SLAs needs of workloads they run. To address this problem, throughput of workloads must be optimized by dynamically re-adjusting the clock speeds and voltages at which processing cores (and hence, circuits, transistors clock frequency) operate. Throughput is different than performance, as it is possible to achieve higher performance per thread or core but with much more power used relatively, versus using more cores with lower performance (i.e. lower clock speed) but less power per core to achieve higher overall throughput.

In a disaggregated computing environment, a customer (tenant) may provision a server with certain number of resources, of which not all may require the same throughput (and thereby the same clock speed) to run workloads at all the times. For some workloads, it may be beneficial to re-adjust the voltage when requiring lower/higher clock speeds so that power consumption is better aligned with the throughput at which the processing core operates. Note that the jump in higher performance (higher clock speed) is non-linear and hence, takes more power than operating at lower clock speeds. Though, if throughput is the goal, such can be achieved by lower clock speeds with more cores, however, while the overall power used is less, there is a higher use of resources (i.e. more processing cores).

State-of-the-art processors, servers and operating system have the ability to adjust voltage and clock frequencies for each processor core based on fixed policies such as a standardized fair share policy. However, the same cannot make such adjustments based on known, predicted or requested workload needs. Hence, they are unable to take SLA terms into consideration when making changes to throughput of processing cores. To address such shortcomings, the present invention proposes a technique to allocate power based on workloads' SLA commitments while maximizing the usage of total contracted power allocation from the utility company. Additionally, the present invention provides a technique to determine total power for a datacenter that should be contracted from a utility company for the next contract term based on the usage patterns and forecast.

The following terms and variables are used throughout the disclosure, of which definitions are provided for clarity and understanding:

a. Total_Utilized: A total capability expressed in the terms of electrical power currently utilized across all workloads in the datacenter.
  b. Total_Contracted: A total electrical power allocation contracted from an electric utility company for the datacenter.
  c. Contracted Variation: An electrical power range with the acceptable variation as agreed upon between the datacenter and the electric utility company (e.g. +/−5%) without incurring penalties.
  d. Total_Available: A total processing capability of the datacenter expressed in the terms of electrical power which can be re-allocated to workloads. (Total_Available=Total_Contracted−Total_Utilized)
  e. Workload_Current_Allocated: A current processing capability expressed in the terms of electrical power allocated to each workload.
  f. Workload_Predicted_Demand: A resource usage prediction based on a learned workload model.
  g. Workload_Resource_Overage: A workload demand or surplus capability expressed in the terms of electrical power based on the predicted demand compared to the current resource allocation. (Workload_Resource_Overage=Workload_Current_Allocated−Workload_Predicted_Demand for a particular workload, where if Workload_Resource_Overage>0, then the workload has a surplus of processing capability expressed in the terms of electrical power. Otherwise, the workload requires more power than currently allocated).
  h. Workload_Allocated_Proportion: A proportion of processing capability expressed in the terms of electrical power that is currently allocated to a specific workload versus the total power allocated across all workloads.
  i. Total_Workload_Allocated: A total processing capability expressed in the terms of electrical power allocated across all workloads.
  j. Resource_Unit: A unit of resource being maximized. The resource unit comprises the processing capability expressed in the terms of electrical power (i.e. megawatts). Examples of Resource_Units in this case may be additional processing capability derived from increasing the power to processing cores of a particular workload or processing components which can be dynamically allocated to a particular workload.
  k. Time_Window: A time window of a duration for which the Total_Available electrical power is being maximized. Any particular Time_Window may be defined with a configurable granularity (e.g. per second, minute, hour, day, week etc.).

Turning now to FIG. 1, a block diagram of a disaggregated computing environment is illustrated, including cloud environment 100. Within cloud environment 100 is the disaggregated computing system comprising physical hardware resources 200. Physical hardware resources 200 may comprise of classifications of the hardware resources such as a storage device pool 202, a Graphics Processing Unit (GPU) device pool 204, a CPU device pool 206, a memory device pool 208, and a network device pool 210. The physical hardware resources 200 are in communication with a power management module 250. Power management module 250 may comprise of such components as a workload resource utilization predictor 258, a power maximization engine 260, and a power allocator 262, each of which may be in communication with a workload statistics database 254, a configuration database 252, a workload resource utilization monitoring system 256, and a power provisioning engine 264.

As will be further discussed, the configuration database 252 stores predefined values of data center level variables (e.g. power expressed in Total_Contracted, Total_Utilized, and Total_Available). The workload statistics database 254 is responsible for receiving statistical information, (such as for a unique workload ID, resources allocated (Workload_Current_Allocated), predicted demand (Workload_Predicted_Demand), resource overage (Workload_Resource_Overage), current consumption, average utilization and other runtime statistics, workload SLA types, business logic and workload impact) of the expected workloads in the datacenter.

The workload resource utilization predictor 258 models workload usage patterns based upon metrics collected from the workload resource utilization monitoring system 256, which is responsible for monitoring the utilization of each workload in the system. The power allocator 262 prepares power allocation instructions based on computations of the power maximization engine 260 and sending the power allocation instructions to the power provisioning engine 264. The power provisioning engine 264 invokes the instructions received from the power allocator 262 (i.e. increases or decreases power to processing cores of a particular workload or migrates freed-up processing components to a particular workload). The power maximization engine 260 receives input from the workload resource utilization predictor 258, and computes the various variables as previously defined.

In communication with the cloud environment 100, the power management module 250, the provisioning component 260, and the physical hardware resources 200, are tenants 212A, 212B, and 212n. Tenants 212A, 212B, and 212n may communicate with the cloud environment 100 provided by any signal-bearing medium.

It should be noted that the elements illustrated in FIG. 1 provide only an example of related components that may be included in the disaggregated computing architecture. For example, power management module 250 may include other components than workload resource utilization predictor 258, power maximization engine 260, power allocator 262, workload statistics database 254, configuration database 252, workload resource utilization monitoring system 256, and power provisioning engine 264, while staying in spirit and scope of the present invention. Additionally, the management module 250 and the components therein may physically comprise of separate entities, or may be combined into one entity. Furthermore, the duties of the power management module 250, and thus the components therein, may be performed and comprised of physical components, computer code, or a combination of such.

Figure 2:
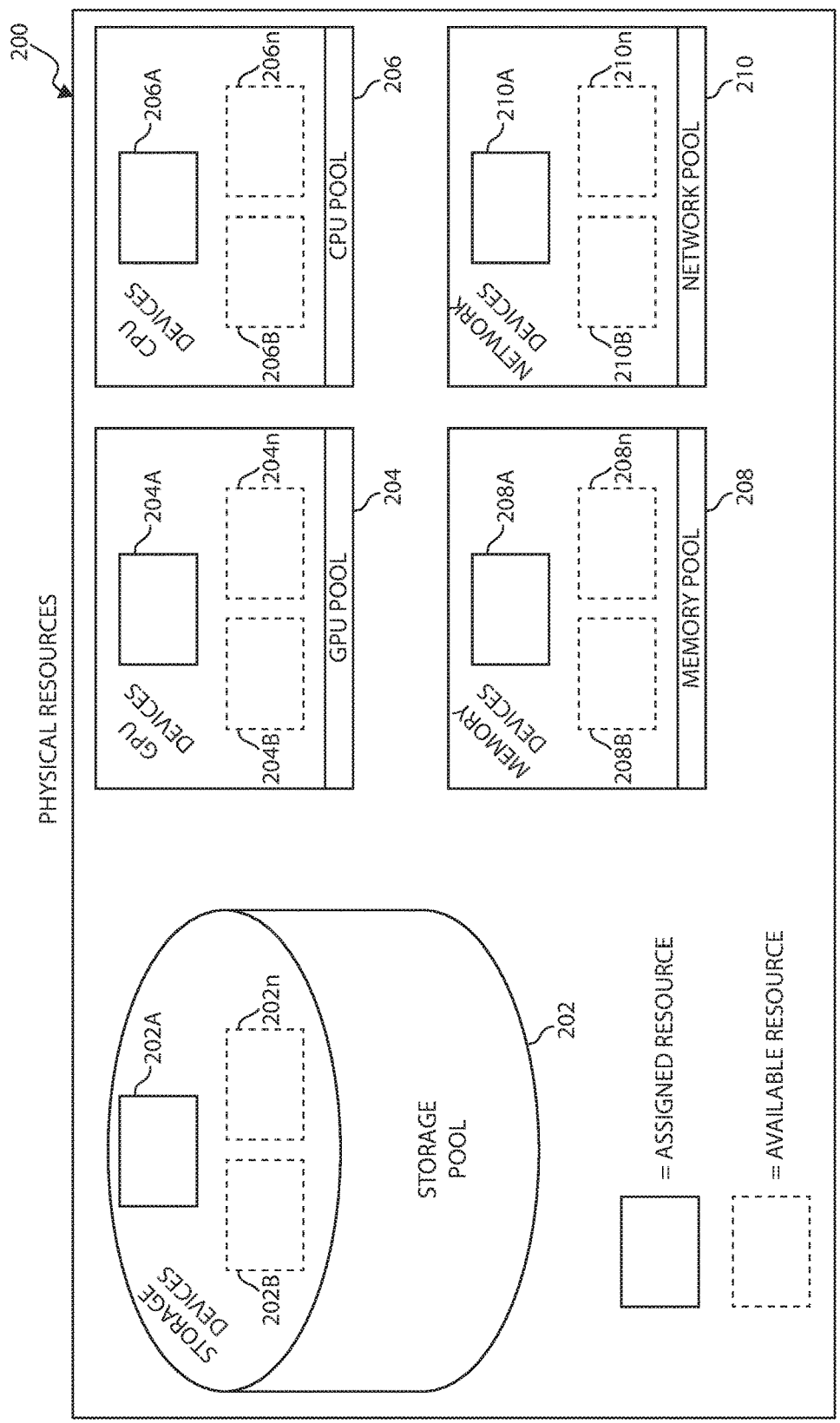
FIG. 2 is an additional block diagram illustrating a hardware structure of a disaggregated computing environment, in which aspects of the present invention may be realized.

FIG. 2 is a block diagram illustrating the physical hardware resources 200 portion of FIG. 1. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n. Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e. storage device 202A, GPU device 204A, CPU device 206A, memory device 208A, and network device 210A) are assigned hardware resources to one or more tenants (i.e. tenants 212A, 212B, 212n). Hardware resources appearing in dashed line (i.e. storage devices 202B, 202n, GPU devices 204B, 204n, CPU devices 206B, 206n, memory devices 208B, 208n, and network devices 210B, 210n) are unassigned hardware resources which are available on-demand for a respective tenant 212A-n workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g. a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g. 1 meter) away in location. In another example, because the disaggregated system is not based on virtual components but rather physical components (i.e. actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

In various described embodiments herein, the present invention uses existing prediction techniques to estimate a workload's demand and allocates available power, or removes the workload's allocated power (based on a workload priority), which would be wasted, otherwise. A total available power is monitored and tracked. Power is maintained at as small variations as possible from the contracted utility power for the datacenter. In some embodiments, the total power available is allocated to workloads in need based on the workload's priority to provide them an additional throughput boost, while keeping the overall utilization within the range power contracted for such datacenter. For example, increasing the voltage of processing cores running such a prioritized workload and thereby increasing the clock speed will use additional power, yet for a good cause (e.g. large data analytics that can be performed whenever higher priority workloads are not using power). If there is not sufficient total available power in the datacenter to match maximum contracted utility power while the workloads require additional power based on the predicted demand, the system removes the estimated surplus power and/or reduces the voltage allocated to some of the workloads (with lower priority) and allocates it to the higher prioritized workloads based on their predicted demand.

The priority of the workloads is determined based on their SLAs, or other business rules, as assigned to tenants 212a-n. By allocating the surplus power available and driving the total power available towards zero within the variation from what was nominally allocated, the system balances the total power consumed at the datacenter and matches more efficiently with the range of power that was actually contracted from the utility company.

The present invention therefore attempts to maximize the utilization of power contracted from utility companies rather than reducing power consumption, where SLAs or other business logic requirements are taken into consideration when maximizing the use of the power allocated. This is an important distinction from prior art, which primarily hibernates or powers down under-utilized servers to save power consumption. In another prior art, power is adjusted based on high/low usage but it does not focus on maximizing the use of the power allocated from the utility company by leveraging workloads with opportunistic SLAs to adjust the power delivery, while maintaining SLAs. Additionally, and at the same time, the disclosed invention also improves the utilization and throughput capacity of the deployed hardware and software at a datacenter.

As aforementioned, this functionality is achieved through a policy based power management service, which implements a technique to maintain the power utilization variation within the range allocated (contracted) by the utility company while maximizing such use of power and its utilization thereby achieving the desired workload throughput. This is uniquely achievable in a disaggregated computing system as processing components can be quickly switched from one workload to another and where large, disaggregated systems have the capability of driving many concurrent workloads. Hence, there are always workloads to be performed whether active or in suspended mode, as well as other workloads to be resumed, all of which may be triggered quickly within milliseconds of response time.

Using the aforementioned example, if a utility company has allocated (contracted) 10 megawatts of power with an acceptable ±5% variation with no penalties for such variation of power use, then the datacenter is allocated a power range of 9.5-10.5 megawatts. Even though the range is acceptable, a datacenter with high capital investment would prefer to be on upper bound of the total power utilization (i.e. over-utilize rather than under-utilize), thus driving the total additional available power within the datacenter towards zero while maintaining a goal of executing the allowed 10.5 megawatts.

One fundamental principle recognized by the functionality of the present invention is that energy/power used by each processor/processor core (not only in a disaggregated computing system but in general computing) is a measure of work and utilization of performing respective workloads versus a maximum amount of power or energy each individual processor/processor core is able to consume over a given period of time. This maximum amount of power or energy able to be consumed by the individual processor is dependent upon an individual specification (design) of the chip itself, the amount of heat the processor is able to dissipate based upon its cooling budget, and an amount of available power (e.g. an amount of power available from the utility company, or input power specifications). For example, as very-large scale integration (VLSI) chip technology advances, and smaller and smaller transistors can be fabricated within a given area of a chip, more functions are possible—however while these transistors can also switch faster and perhaps operate at lower voltages than previous larger transistors, they may either not all be working (not all transistors in a chip will switch) and/or the energy or power available may remain constant due to cooling limitations, power delivery designs, etc.

Stated differently, as is the current state of the art, processor utilization is generally calculated based on its operating system state of all the processes the processors/processor cores have "run" versus "idle" processes running over a given period of time. However, when a process is in a "run" state, the amount of work it performs (i.e. the amount of power or energy it consumes) depends heavily on the code running by the processor. For example, some codes are heavy in floating points while others are performing memory transactions and are stalling (for a short enough time that the operating system cannot measure) on cache misses while the memory is read (even when multi-threading/issues are sent to the memory controllers from all the cores). Thus, an I/O operation may have a higher wait time such that if a core/process waits on an I/O, the process is usually marked as "I/O wait" by the operating system. This does not provide an accurate measurement for the amount of "work" or otherwise a base utilization of the processor/processor core.

The present invention therefore calculates the utilization of each processor/processor core, or rather any functional subsystem component, differently. The functionality provided herein provides that each of a multiplicity of "energy factors" may be calculated and measured in real-time to obtain a total utilization of each processing component (e.g., in this example, processor/processor core) by comparing a calculated aggregate work of each of the energy factors against a maximum amount of power able to be consumed by the respective processor/processor core over a given period of time. That is, the utilization of each processor/processor core is not determined by whether it "runs" processes or is "idle", but rather takes into consideration "what" processes the processor/processor cores are running. The calculated energy factors may include an allocated voltage and clock speed of the processor/processor core (or an adjustment to the allocated voltage and clock speed), an amount of power being consumed (either in real-time or over a predetermined timeframe), a type of process being performed (e.g. dependent upon code, SLA, or other factors), and/or the specific processor instructions being executed. Of course, a multitude of other factors or subsets of factors may be considered as one skilled in the art would appreciate.

In addition, one needs to observe that in a processor chip (which has a collection of processor cores) that is limited to a maximum energy (power) dissipation based on the factors mentioned (e.g. power dispassion/cooling design of the package, or power allocated to that processor chip etc.), each of the cores may execute different instruction sets per their specific workloads, and/or may have different cache memory hits (from perfect to bad) behavior which will stall the multi-issue memory transactions and require cores to wait for memory reads (as core speed is much higher than memory latency read times). As such, each core may consume different energy levels. This can lead to different utilization of the energy provided to the processor chip as a whole (which has multiple cores each at different speeds and voltages). In attempt to use this energy over the processor chip, different cores may have an opportunity to run at a higher voltage and higher clock speeds (which is why a higher voltage is needed—to run at a higher clock speed) so as to keep energy utilization as close to 100% as possible.

If a given processor chip (here again, the processor chip is used in this example, where any functional component may be referenced) cannot use its allocated energy, for whatever reason, and after attempting all the processes provided herein to use as much energy as possible having been allocated to that processor chip, it may be said the processor is under-utilized if an overall utilization reading is determined to have a negative ratio. The overall utilization reading for each component or subsystem (e.g. processor) may be calculated as: (actual used energy per chip−min energy per chip)/(max energy per chip−min energy per chip), where min energy per chip is energy the processor chip consumes even if the cores are not processing anything, max energy per chip is the maximum total energy the chip is allowed to consume, within the cooling design of the package, or, the allocated energy allowed for that chip, and actual used energy is the total energy per chip used. All this is measured over a time window T, which may be of short duration (e.g. a few seconds or a minute).

Various patterns of the overall utilization reading may be used to classify workloads based upon a calculation of the overall utilization reading for each component or subsystem over a predetermined period of time. That is, the overall utilization readings for a processing subsystem, a memory subsystem, an accelerator subsystem, and/or a networking subsystem may be viewed as part of the power management of the disaggregated system over the predetermined time period to classify a detected similar incoming workload of the same class.

For example, the classifications may include: a) Cache friendly workloads which consume relatively little energy from memory subsystem and much more energy from a cache memory subsystem while core(s) subsystem and/or accelerators subsystem still consume energy for performing a computation. b) Cache unfriendly workloads which consume relatively more energy from the memory subsystem and much less energy by their cache memory subsystem while core(s) subsystem or accelerators subsystem still consumes energy for performing a computation. c) Computation-bound workloads which consume relatively more energy from their cores or accelerators subsystems and very little from their memory and/or their networking subsystems. d) Input/output (I/O) bound workloads which consume relatively more energy from their networking subsystem and relatively little energy from their cores and accelerators subsystem.

These classifications may be used to dynamically allocate power to the individual components or subsystems and/or dynamically allocate a number of the individual components or subsystems to the detected incoming workloads having similar past overall utilization readings. Consider an example of a previous workload x, which, upon obtaining the overall utilization reading of all components or subsystems in the disaggregated system has been found to be a computation-bound workload. When this workload x returns (whether the identical workload or a similar workload), the disaggregated system is able to determine that workload x will need more processor energy, or more processors allocated, to perform workload x efficiently. The disaggregated system also is able to determine that workload x will not need as much memory and networking power, or a lesser number of memory and networking components allocated. Thus the disaggregated system is able to, in real-time, adjust either a number of components allocated to individual workloads based upon their overall utilization readings from past experiences and/or adjust the power allocated to individual components used to perform the workload (whether scaled-up or scaled-down). In other embodiments, this overall utilization reading pattern may be used to dynamically assign power and/or components and subsystems to individual users, certain applications, or a combination thereof.

Thus, calculating the aggregate work using the multiplicity of energy factors and obtaining the total utilization of each of the processors/processor cores (or other components), may be used to re-allocate power between processors/processor cores or other subsystems in order to balance power or otherwise de-allocate components or subsystems as to obtain a same throughput using less energy throughout the system using the described algorithms below.

Figure 3:
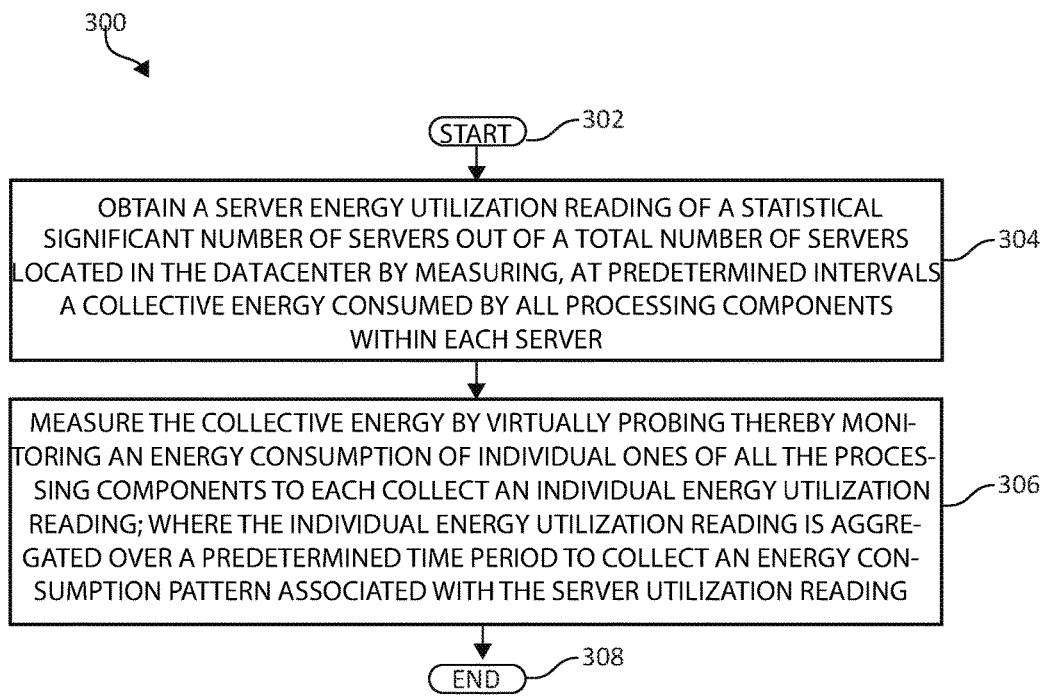
FIG. 3 is a flowchart diagram illustrating a method for power management in a disaggregated computing system, in accordance with aspects of the present invention.

FIG. 3 illustrates a method 300 for measuring component utilization in a computing system. The method 300 may be performed in accordance with the present invention in any of the environments depicted in FIGS. 1 and 2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a Central Processing Unit (CPU), a Graphical Processing Unit (GPU), an Application Specific Integrated Circuit (ASIC), a Field Programmable Gate Array (FPGA), etc., combinations thereof, or any other suitable computing device known in the art.

The method 300 begins (step 302) by obtaining a server energy utilization reading of a statistical significant number of servers out of a total number of servers located in the datacenter by measuring, at predetermined intervals, a collective energy consumed by all processing components within each server (step 304). The collective energy is measured by virtually probing thereby monitoring an energy consumption of individual ones of all the processing components to each collect an individual energy utilization reading; wherein the individual energy utilization reading is aggregated over a predetermined time period to collect an energy consumption pattern associated with the server utilization reading (step 306). The method ends (step 308).

In some embodiments, the power management module 250 can prioritize workloads into different categories where each category includes ranges of allowed clock speed and voltage (e.g. High (clock speed range a-b); Medium (clock speed range c-d); Low (clock speed range e-f)). The power management module 250 may further dynamically adjust the range of each category (the voltage and the clock speed of the processors/processor cores) based on analysis of a usage pattern of the workloads and forecast of the clock speed requirements (e.g. some workloads may have seasonal or periodic pattern of resource utilization). Of course, a host of other categories and priorities may be used other than a "High, Medium, and Low" priority, category, or range depending on the actual implementation, as one of ordinary skill in the art would appreciate.

Further actions may perform re-categorizing a workload based on its usage requirements and forecast. For example, if a Low priority workload always requires a ceiling level of its clock speed range, then it should be re-categorized as a Medium priority workload. Conversely, if a High priority workload generally requires a lower level of its allowed range for clock speed, then it may be re-categorized as a Medium priority workload, and so on. Additionally, power may be assigned to certain workloads based on demand in order to increase performance (clock speed) of the processor/processor core by lowering the power and hence, clock speed of other, lower priority or lower demand workloads. Furthermore, the mechanisms of the power management module 250 may determine a more accurate amount of contract power for a next term from a prediction/forecast of priority distribution.

Figure 4:
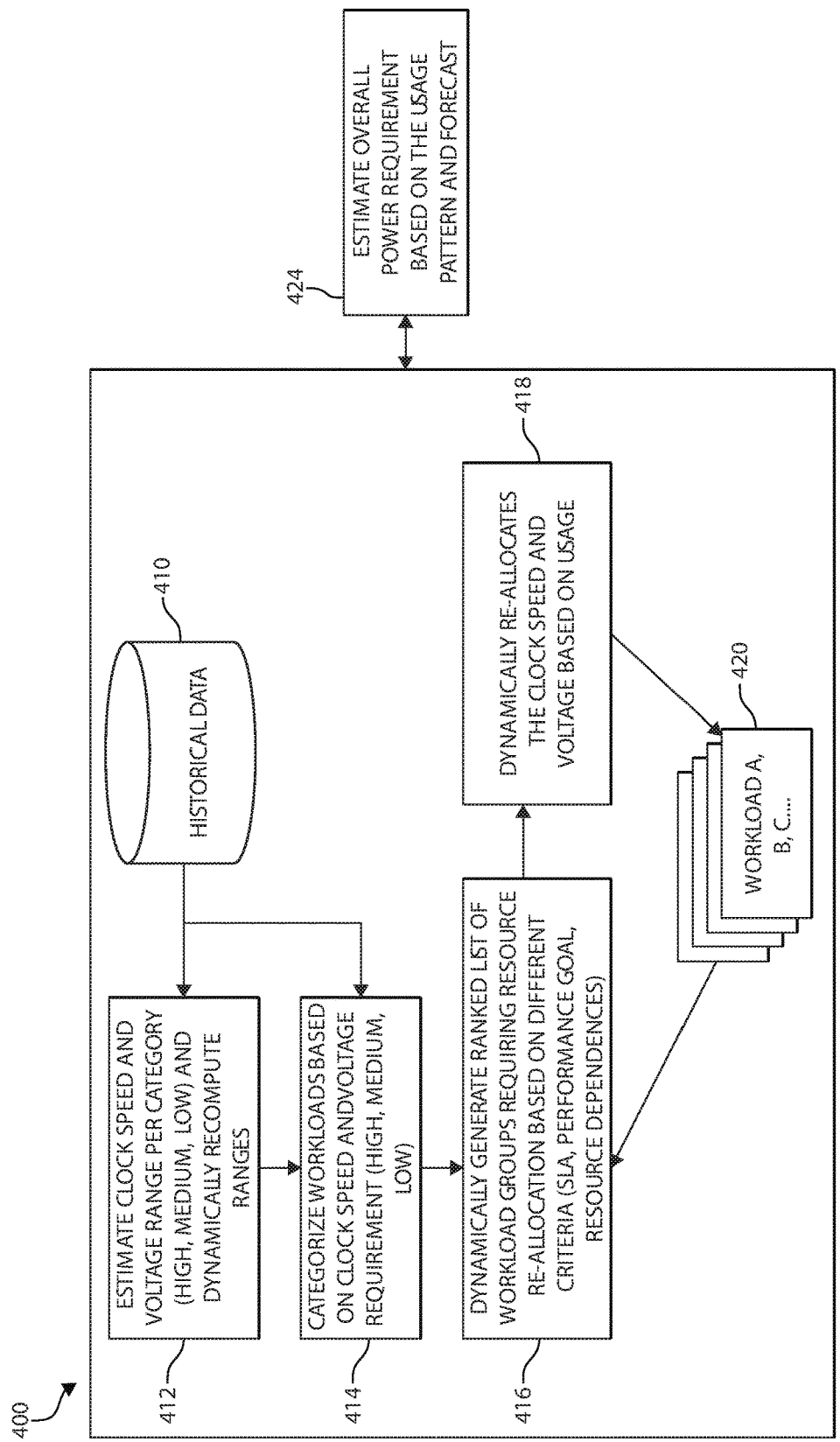
FIG. 4 is block diagram illustrating a high level view of power management in a disaggregated computing system, in accordance with aspects of the present invention.

Continuing to FIG. 4, a block diagram, high-level view 400 of one embodiment of the present invention is illustrated. A historical usage data 410 is analyzed by the system to estimate the clock speed floor/ceiling range of the High, Medium, Low (or other predefined) categories 412. The system dynamically readjusts the range for High, Medium, Low categories based on the changes observed in the historical usage data 410. In one example, the ranges for the categories may be statically defined, whereas, in another example, the range may be automatically estimated based on the historical usage pattern 410 and the forecast of the demand.

The system uses the historical usage data 410 to categorize the workloads in different priorities of clock speed and voltage 414. A ranking of workload groups 420 is performed based on SLA, priority, resource dependencies to determine the order in which the resources (power) are re-allocated 416. Different factors may be taken into consideration to form the criteria for grouping the workloads. One advantageous set of criteria may be focused on workloads with complimentary resource usage patterns where resource movement will have minimal impact. For example, a workload X with High SLA may have a high usage pattern and will be categorized in the High clock speed range category versus another workload Y also has high SLA but may have a low usage pattern will be categorized in the Low clock speed range category. Taking these workloads with complimentary resource usage pattern to re-allocate electrical power will help maximize the electrical power utilization, hence minimizing the total available power while satisfying the SLA. Another set of criteria may be criteria in which the workload owner specifies a group of workloads where there is a group performance goal or group power savings goal in which the goals of the group are more important than the goals of a particular workload. The system then dynamically re-allocates power to permit the higher clock speed from one workload to another to fulfill the clock speed demand 418.

Moreover, adjustments to the allocated or re-allocated voltage and clock speed of each processor/processor core may be performed upon detecting an input electrical source (e.g. utility power) has been reduced. For example, during a "browning" of the utility power grid, an outright power failure requiring the need of Uninterruptible Power Supply (UPS) or generator usage, or other situations where the input power to the datacenter is not at full capacity, power may be re-allocated from the processors (adjusting the voltage and clock speed therein) performing lower priority workloads to higher priority workloads, dependent upon SLA requirements of the respective workloads being performed.

Such is the case when the utility power is no longer provided, where a datacenter needs to first run for a time (e.g. a few seconds to a minute) on battery power (to allow proper shut down of workloads of SLAs that have not been optioned to continue running during a power shortage) until backup generator(s) at the datacenter have been able to start and bring a certain amount of power online (i.e. the generator(s) may generate a portion of the total utility power used in normal operation only to cover those workloads and SLAs having been contracted to run on such power interruption).

Generators take some time to power on and some time to change their output power, in the same way a certain lag is seen when a car is accelerated by pushing the gas paddle all the way to the floor before full acceleration is reached. Therefore, a UPS is often used at an immediate time after power interruption to enable the entire datacenter to get into a power emergency mode, shut down servers and services that where not explicitly contracted for power shortage (e.g. by taking a snapshot of the memory image and pushing the image to flash memory quickly to create a resume point later on). After a few seconds (e.g. 10-30 seconds generally), the generator(s) are able to stabilize their power production to provide backup power to the rest of the services and resource pools that are contracted to keep running or are otherwise engaged to run in case of a power shortage/emergency.

During the backup power generation, the aim is to save as much as possible the fuel needed to power the backup generator(s) and if a service or resource pool does not use or need the backup power, to shut it off to be later restarted within milliseconds based on the disaggregated architecture. For services/workloads/resource pools which are contracted to run on backup power, the speed to execute the service would be the minimal possible to sustain the real-time throughput needed by that service and its processing. Hence constant adjustments for clock speed and voltage are needed to lower the energy consumption of that service/workload/ resource pool and only increase such when the throughput detected is slower than that needed for the real-time processing delivery as contracted.

Given that this processing can be erratic during the generation of backup power, the datacenter battery farm is used as a smoothing statistical mean to mitigate the variation between the time taken to adjust the local generators power output and the time taken to have to respond to real events with additional energy needs for processing. In times of valley use, the extra power generated by the power generators is stored in the batteries until the generator(s) adjust its power output to be lower (and consume less fuel) and vice versa, the battery provides the extra power needed momentarily before the generator can generate more power output and consume more fuel.

In some instances, depending on an amount of electrical power provided during the reduction and/or interruption of the utility power by either the UPS, the generator(s), or a combination thereof, power may be re-allocated (after a predetermined time period on generator power) from one or more processors performing lower priority workloads (according to an SLA) to a higher priority workload, such that the lower priority workload is stopped or temporarily suspended until normal utility power is restored.

In other instances, certain individual components or subsystems (i.e. processor cores, processors, etc.), regions of subsystems (i.e. pools of processors, pools of memory components, etc.), or entire composed disaggregated systems may not be provided with backup electrical power, given the components, regions, or disaggregated systems are executing workloads having SLA requirements that do not include backup power during an interruption. For example, during a utility power interruption (or upon the detection of a utility power reduction over a predetermined threshold), a UPS in the datacenter may keep certain components or systems supplied with power until generator(s) are started and begin supplying power to the datacenter, including the individual components or systems. After a predetermined time period of running on generator power, the systems may start to systematically shut down (and therefore shut off power) to the individual components or systems. This may include disaggregated systems shutting down granular components such as individual processors or processor cores, pools of subsystems (e.g. pools of processors, memory components, etc.) or may include shutting down one or more entirely composed disaggregated systems.

In another example, certain "regions" of the datacenter may be designated for running workloads having SLAs of varying priority. One region of the datacenter (having multiple disaggregated systems therein) may be designated for running high priority SLA workloads, one region may be designated for running medium priority SLA workloads, and one region may be designated for running low priority SLA workloads. During the utility power reduction or interruption, the region of the datacenter (and thus the multiple disaggregated systems therein) running the low priority SLA workloads may be shut down and removed from the generator power after the predetermined time period has elapsed. To this end, the entire region may be shut down and removed from generator power simultaneously, or certain disaggregated systems within the region may first be shut down, followed by other systems, followed by more systems, in a systemic process according to an SLA hierarchy of the workloads being performed. Of course, as mentioned herein, the "high priority", "medium priority", and "low priority" is only representative of a few examples to clearly explain the invention. In an actual implementation, a variety of priority levels, SLA considerations, or other factors may be considered according to the specific needs of the implementation.

These workloads/SLAs can be of many use cases. For example, the datacenter may have workloads that are in an alternate site for a primary datacenter in case of disaster recovery, that usually do not run but rather are maintained in an updated state from a first datacenter, but may be required to run if a disaster impacts the primary (first) datacenter location. Another use case may consist of workloads of generally high priority SLAs which have an exception not to run in such a disaster recovery or power outage situation.

Thus, if a total power consumption of a datacenter is say 10 Megawatts during normal operation, it may only need 1 Megawatt of emergency power generation which ultimately saves costs for the datacenter provider and the user. Using the power balancing algorithms and methodologies provided herein, some high priority SLAs may not actually consume all the power as they normally would, as they either may do less work and/or such can be run at lower clock speeds and voltages so as to conserve the backup power needed.

Moreover, using these models and methods, overall power consumption can be estimated based usage pattern and forecast for a next term to contract a more accurate amount of electrical power to meet the workload demands of the datacenter 424.

Figure 5:
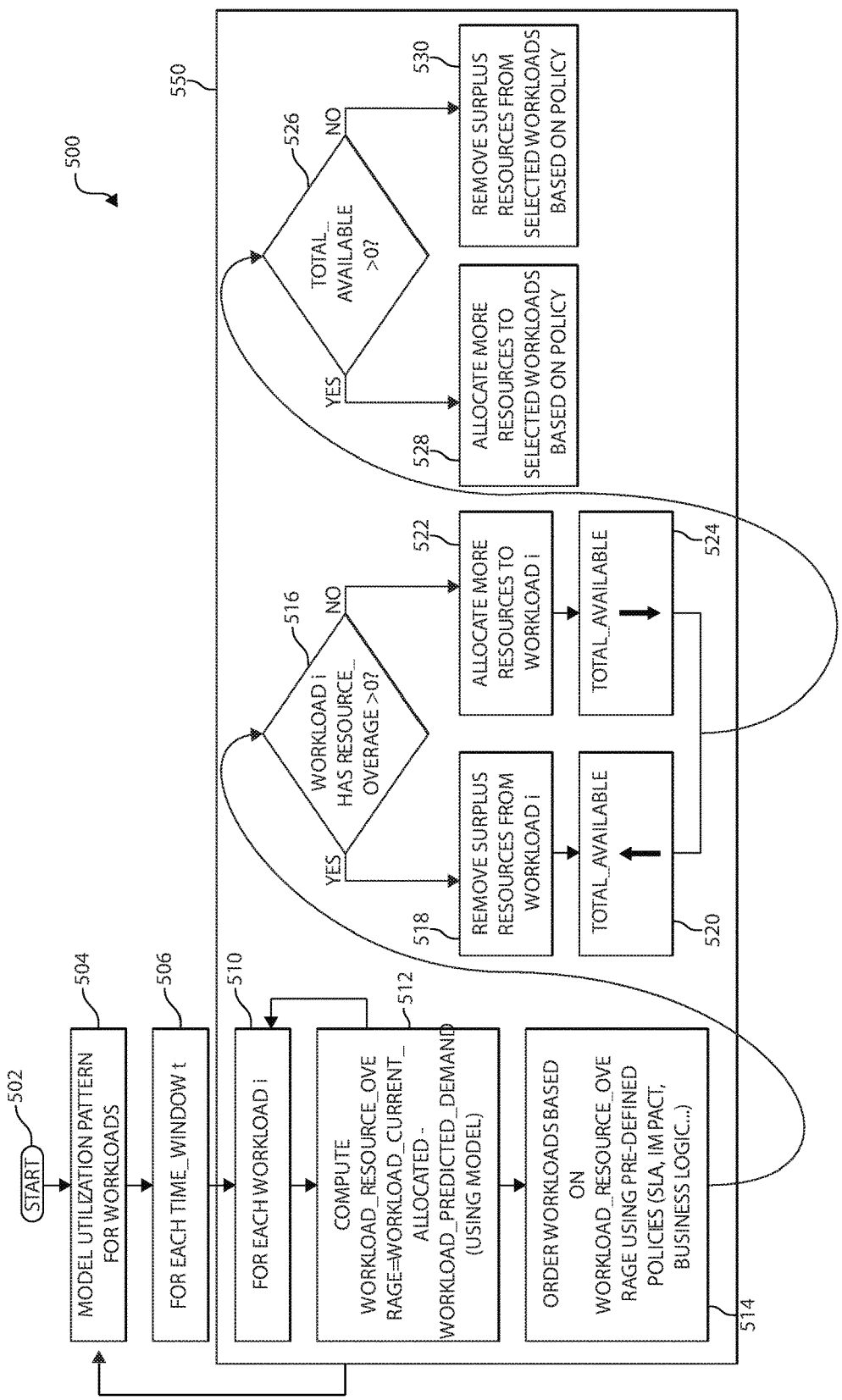
FIG. 5 is a flowchart diagram illustrating a power management algorithm for power management in a disaggregated computing system, in accordance with aspects of the present invention.

Advancing, another embodiment is disclosed with reference to FIG. 5. FIG. 5 illustrates a method 500 for power management in disaggregated computing systems, in accordance with one embodiment of the present invention. The method 500 may be performed in accordance with the present invention in any of the environments depicted in FIGS. 1 and 2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning (step 502), A usage pattern is modeled for each workload using well-known methods such as standard regression modeling techniques (step 504). As discussed, as small variation in power utilization is maintained within the contracted electric power range, where the goal is to drive the Total_Available close to 0 (such that maximum utility provided power is used), however, under all circumstances the Total_Available should be less than the Total_Contracted times Contracted_Variance. In a traditional server bound environment, however, it may be desirable to maintain a power reserve to quickly allocate to high priority SLAs if erratic needs arise but in a disaggregated environment, re-allocation of resources may be triggered quickly within milliseconds.

Continuing, within each Time_Window t (step 506), a power management algorithm 550 is calculated as follows:

For each workload i (step 510), the Workload_Resource_Overage$_i$ is computed and stored in the workload statistics database 254 (step 512), expressed as:

$$Workload\_Resource\_Overage_i = Workload\_Current\_Allocated_i - Workload\_Predicted\_Demand_i$$

The Workload_Resource_Overage is ordered, for example, based on an SLA and/or an impact policy, and/or a business logic (step 514). A determination is made as to whether the workload i has a Workload_Resource_Overage>0 or a Workload_Resource_Overage<0 (step 516). If workload i has a Workload_Resource_Overage>0, resources are removed from all workloads with positive Workload_Resource_Overage$_i$ thereby having a surplus of resources (step 518), and the Total_Available is computed (step 520), expressed as:

For each workload i:

If Workload_Resource_Overage$_i$>0 then, $$Workload\_Current\_Allocated_i = Workload\_Current\_Allocated_i - Resource\_Unit$$

$$Total\_Available = Total\_Available + Resource\_Unit$$

If, at step 516, the workload i has a Workload_Resource_Overage<0, resources are allocated to workloads having a negative Workload_Resource_Overage thereby having a greater demand for resources (step 522), and the Total_Available is computed (step 524), expressed as:

For each workload i:

If Workload_Resource_Overage$_i$<0 then, $$Workload\_Current\_Allocated_i = Workload\_Current\_Allocated_i + Resource\_Unit$$

$$Total\_Available = Total\_Available - Resource\_Unit$$

Continuing, a determination is then made as to whether the Total_Available>0 (or >>0) or the Total_Available<0 (step 526). If, at step 526, the Total_Available>0 (or >>0), resources are proportionally distributed to the existing workload or additional workloads that are able to run, based on the proportion of the existing allocation, or manual input regarding workload expansion as based on the specified policy and the SLA (step 528), expressed as:

For each workload i, $$Workload\_Allocated\_Proportion_i = Workload\_Current\_Allocated_i / Total\_Workload\_Allocated$$

$$Workload\_Current\_Allocated_i += Workload\_Allocated\_Proportion_i * Total\_Available$$

$$Total\_Available = 0$$

If, at step 526, the Total_Available is below 0, then resources are proportionally removed from the Workload_Current_Allocated$_i$ or the workload may be suspended, based on the proportion of the existing allocation or manual input regarding workload expansion in the SLA (step 530), expressed as:

For each workload i, $$\text{Workload\_Allocated\_Proportion}_i = \text{Workload\_Current\_Allocated}_i / \text{Total\_Workload\_Allocated}$$

$$\text{Workload\_Current\_Allocated}_i \mathrel{-}= \text{Workload\_Allocated\_Proportion}_i * \text{Total\_Available}$$

$$\text{Total\_Available} = 0$$

For each workload i, the model referenced in step 504 is iteratively updated using the power management algorithm 550.

In some embodiments, a priority order may be used to allocate additional power between workloads when the Total_Available>0, as illustrated within the chart in FIG. 6. Table 600 shows an example of a priority order that may be used to allocate the additional power between workloads when total available power is above zero, in order of priority 1 to 4. Table 600 illustrates that a first priority may be based on a critical, predictable SLA, a second priority based on an erratic, yet critical SLA, a third priority based on an opportunistic and predictable SLA, and a fourth priority based on an erratic, opportunistic SLA workload. The same order applies in reverse for determining priority for removing power when the Total_Available is below 0 (i.e. from workload priorities 4 to 1). Of course, as one of ordinary skill in the art would appreciate, there may be additional SLA priorities beyond those described which will modify the above order of allocating power in the same proportion.

In other embodiments, the present invention provides for novel mechanisms to measure a total utilization of entire datacenters, by aggregating energy measurements provided from processing components as granular as a processor core (i.e. a portion of a processor), to racks comprising multiple processors, up to and including all components (e.g. accelerators, networking components, memory, cache etc.) within the entire datacenter itself. Instead of collecting this measurement from a "power room" in the datacenter, this methodology of energy measurement provides the unique opportunity for individuals who do not either have access or whom are otherwise more casual users (not high-level administrators) to obtain metrics regarding an actual utilization of the components within the datacenter in order to achieve a better overall efficiency and throughput of such components, and thus allow for users to consider the collection of the resources they have rented and how they can optimize such, in addition to the datacenter operators whom can over-provision resources within the different SLA priorities and still perform to the various SLAs conditions with additional revenue generated on same cost platform. These mechanisms are in contrast to obtaining temperature or other complicated and intrusive readings to determine resource and/or datacenter utilization as commonly applied in prior art.

For example, when a user whom is not the datacenter owner has a need to know what the utilization of the datacenter is (as defined above by energy based utilization and not operating system based state of processes utilization), virtual probes may be implemented to read energy registers of processing components, or portions thereof (processor cores, etc.), over multiple different servers. Such a probe may be incorporated as the smallest possible Virtual Machine (VM) entity that can be defined at a cloud service provider.

There are two aspects of this probe. A probe normally is reading, at certain periods or intervals of time (e.g. a minute), the energy consumption register of the processor/server (which aggregates all cores' energy use for that server). Such may have also readings of the processor package energy, the cores energy, the memory energy, the accelerators' (e.g. GPU cores or FPGAs if available) energy, and the networking components' energy.

In probe mode, such a small VM runs over a long period (week, month or so) and collects the following data: the maximum energy ever observed in the processor; the minimum energy ever observed in the processor; and the average of energy observed over time, by calculating energy reading differences read each time the probe was reading such for the processor chip/server. If a probe happens to be in a server that always is busy, it will always read the maximum energy. Similarly, if a probe happens to be in an idle server, it will always read the minimum energy.

Next, over all the probes running in the datacenter, a global minimum and a global maximum energy is calculated for those probes allocated in the same type of a server (where the server type references to different specifications that may be possible for servers provided by a cloud service operator—for example, in a different type the server may have different processor versions or use older generations of processors vs. newer generations, etc.). For all probes allocated to the same type of servers, a global maximum and minimum are calculated at a predetermined time to obtain the overall utilization of the datacenter among all probes incorporated into servers of same type.

Provided that there are a statistically meaningful number of probes monitoring different servers each (as discussed below), at the datacenter, an overall utilization of that datacenter may be calculated as energy or power utilization to be: (average of all probes (or average energy seen over time by each)−global minimum power calculated from all probed servers)/(global max power calculated from all probed servers−global minimum power calculated from all probed servers).

To add new probes to an existing set of probes, each of the existing set of probes run a "power virus" (a set of instructions designed specifically for generating a maximum energy consumption per the tiny VM allocated in a server). The run/stop time pattern of the power virus will be a key to be detected by the new candidate monitoring probe of the VM being allocated. The power virus in all existing VM probes is then run at times that can be detected as such (e.g. off 10 seconds, on 20 seconds, off 20 seconds, on 5 seconds, and more), to form a peak/valley chain of detectable changes in energy by the new candidate probe in a new tiny VM. This pattern or key repeats over a longer period of time (e.g. minutes to an hour or so) to allow accurate detection by the new candidate probe.

The new candidate probe then reads the energy the processor chip or server is using as it is able to observe. If there is any correlation with the power virus patterns of on/off periods the other (existing) probes generate, the new candidate probe will be released and a random waiting time will be waited before a new VM be allocated in which the process begins again. Similarly, if the new candidate probe continually observes a maximum energy output with no changes, the new candidate probe will be released and after a random waiting time, a new probe will be provisioned with a new VM allocation. Thus the process to add new probes will ensure that only unique probes running on different servers were allocated before turning all of them to be probing of energy/power consumption.

The allocation of new probes will continue and can happen over few days or more, until a statistically meaningful number of probes based on the known or estimate size of a datacenter location where a cloud service is running, is successfully allocated. This number is derived from known art of statistics. Moreover, the total time of monitoring the datacenter in this way should also be long enough to observe most of the changes due to day of the week or mask out other events (e.g. holidays, vacation times in summer or starting a new datacenter vs established one) which may affect the average utilization measured.

In other embodiments, on the user measured side, a company that is running hundreds of instances of servers composed out of resources in the disaggregated system (where "compose" means a system is put together by wiring, in this example with optical switches connecting fibers to form end-to-end connections between subsystems or resource pools), may also have direct access to read energy consumption of all allocated servers and thus may also evaluate workload performance and how efficient their use is. This can benefit users to perhaps reduce cost at least at some times, depending on the pattern of energy use over all their allocated resources and the subsystems/resource types used and at what times, etc. This functionality is directly attributed to the use of disaggregated systems. Note, again, this disaggregation is separate from on-demand model that cloud computing generally provides. In the on-demand model, users may acquire more resources (VMs) up to a limit of the pre-built physical server boxes that ultimately host a number of users' VMs. In the disaggregated design, the resources are attached per user as needed, and in a more elastic format since the pools of resources are very large and thus adding processors or other components (e.g. scale up or SMP with multiple sockets) can be formed as needed without the limitation of whether or not the resources physically reside in the same server "box".

Conversely, the owner or operator of the datacenter will read energy consumption for all composed servers, and the resources in question (e.g., processors, memory, accelerators, storage, communication networking, cache in each processor, and any/all functional subsystems of interest). Such access to read the energy consumption for all subsystems can be facilitated through the hypervisor or the control network the datacenters' operators have access to as part of the overall management of the datacenter.

The aggregated readings of energy per a period of time will give the operators an accurate state of usage and profile of operation for all workloads running in the datacenter. Such may be in terms of processors utilizing energy. For example, if processors are constantly running at a low percent of utilization, the operator may add more workloads to be allocated or may reduce number of processors in the processor pools used for the datacenter, etc.

This methodology applies as a hierarchy of consideration as well. For example, some of the "regions" in the datacenter may be more utilized than others. The regions are areas that resource pools can be shared in the dynamic composition of servers. Other regions may be less utilized, hence balancing energy and workloads between regions may offer better utilization and provide better efficiency over time. This can also be visible from memory energy use versus cache or versus accelerators (GPUs, FPGAs, etc.) which all help to better decide matching of resources in regions and/or all of the datacenter that is measured.

It is important to note these mechanisms are provided in addition to the discussed methods and schemes a user can perform without having the access as a datacenter operator (where the user accesses energy consumption via probe/power virus VMs etc.). Hence, as a datacenter operator, there is no need to use probe or power virus VMs since the operator can read directly any energy consumption at any location and any subsystem/functional unit and such operator clearly can address and thereby knows the location and IDs of all associated resources without doing any statistical meaningful probing as is the case of the non-operator.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for measuring component energy utilization in a datacenter, by a processor, comprising:
    obtaining a server energy utilization reading of a statistical significant number of servers out of a total number of servers located in the datacenter by measuring, at predetermined intervals, a collective energy consumed by all processing components within each server; wherein the server energy utilization reading is used to dynamically allocate electrical power to respective processing components within each server;
    measuring the collective energy by virtually probing thereby monitoring an energy consumption of individual ones of all the processing components to each collect an individual energy utilization reading; wherein the individual energy utilization reading is aggregated over a predetermined time period to collect an energy consumption pattern associated with the server energy utilization reading; and wherein the energy consumption pattern comprises observed energy consumption values of a maximum consumption, a minimum consumption, and an average consumption between the maximum consumption and the minimum consumption of the server energy utilization reading;
    calculating a global minimum consumption value of a plurality of servers having equal specifications by measuring a minimum observed energy or an average minimum observed energy detected over a plurality of virtual probes monitoring the processing components within each of the plurality of servers;
    calculating a global maximum consumption value of the plurality of servers having equal specifications by measuring a maximum observed energy or an average maximum observed energy detected over the plurality of virtual probes monitoring the processing components within each of the plurality of servers;
    allocating a new virtual probe by running a power virus on previously allocated ones of the plurality of virtual probes to generate for each an energy consumption key, the energy consumption key used to form a peak and valley chain of detectible energy changes to compare against the energy consumption key of a candidate virtual probe;
    when the energy consumption key of the candidate virtual probe matches the energy consumption key of a previously allocated one of the plurality of virtual probes, releasing the candidate virtual probe and creating a waiting time before allocating an alternative candidate virtual probe; and
    attempting to allocate the new virtual probe until the server energy utilization reading of the statistical significant number of servers is reached.

2. The method of claim 1, wherein the processing components comprise at least portions of processors, processor cores, memory components, internal or external accelerators, and networking components.

3. The method of claim 1, wherein virtually probing comprises running a process on a Virtual Machine (VM) while reading an energy register of the processing components; and
    further including obtaining a total utilization of the datacenter according to the algorithm: (average of all probes (or average energy seen over time by each)– global minimum power calculated from all probed servers)/(global maximum power calculated from all probed servers−global minimum power calculated from all probed servers).

4. The method of claim 1, further including presenting the server energy utilization reading to an operator of the datacenter, whereby the operator uses the server utilization reading to adjust at least one of a number of workloads being performed and a number of the processing components allocated to perform respective workloads.

5. A system for measuring component energy utilization in a computing system, the system comprising:
at least one processor device, wherein the at least one processor device:
obtains a server energy utilization reading of a statistical significant number of servers out of a total number of servers located in the datacenter by measuring, at predetermined intervals, a collective energy consumed by all processing components within each server; wherein the server energy utilization reading is used to dynamically allocate electrical power to respective processing components within each server;
measures the collective energy by virtually probing thereby monitoring an energy consumption of individual ones of all the processing components to each collect an individual energy utilization reading; wherein the individual energy utilization reading is aggregated over a predetermined time period to collect an energy consumption pattern associated with the server energy utilization reading; and wherein the energy consumption pattern comprises observed energy consumption values of a maximum consumption, a minimum consumption, and an average consumption between the maximum consumption and the minimum consumption of the server energy utilization reading;
calculates a global minimum consumption value of a plurality of servers having equal specifications by measuring a minimum observed energy or an average minimum observed energy detected over a plurality of virtual probes monitoring the processing components within each of the plurality of servers;
calculates a global maximum consumption value of the plurality of servers having equal specifications by measuring a maximum observed energy or an average maximum observed energy detected over the plurality of virtual probes monitoring the processing components within each of the plurality of servers;
allocates a new virtual probe by running a power virus on previously allocated ones of the plurality of virtual probes to generate for each an energy consumption key, the energy consumption key used to form a peak and valley chain of detectible energy changes to compare against the energy consumption key of a candidate virtual probe;
when the energy consumption key of the candidate virtual probe matches the energy consumption key of a previously allocated one of the plurality of virtual probes, releases the candidate virtual probe and creating a waiting time before allocating an alternative candidate virtual probe; and
attempts to allocate the new virtual probe until the server energy utilization reading of the statistical significant number of servers is reached.

6. The system of claim 5, wherein the processing components comprise at least portions of processors, processor cores, memory components, internal or external accelerators, and networking components.

7. The system of claim 5, wherein virtually probing comprises running a process on a Virtual Machine (VM) while reading an energy register of the processing components; and
wherein the at least one processor device obtains a total utilization of the datacenter according to the algorithm: (average of all probes (or average energy seen over time by each)−global minimum power calculated from all probed servers)/(global maximum power calculated from all probed servers−global minimum power calculated from all probed servers).

8. The system of claim 5, wherein the at least one processor device presents the server utilization reading to an operator of the datacenter, whereby the operator uses the server energy utilization reading to adjust at least one of a number of workloads being performed and a number of the processing components allocated to perform respective workloads.

9. A computer program product for measuring component energy utilization in a computing system, by a processor device, the computer program product embodied on a non-transitory computer-readable storage medium having computer-readable program code portions stored therein, the computer-readable program code portions comprising:
an executable portion that obtains a server energy utilization reading of a statistical significant number of servers out of a total number of servers located in the datacenter by measuring, at predetermined intervals, a collective energy consumed by all processing components within each server; wherein the server energy utilization reading is used to dynamically allocate electrical power to respective processing components within each server;
an executable portion that measures the collective energy by virtually probing thereby monitoring an energy consumption of individual ones of all the processing components to each collect an individual energy utilization reading; wherein the individual energy utilization reading is aggregated over a predetermined time period to collect an energy consumption pattern associated with the server energy utilization reading; and wherein the energy consumption pattern comprises observed energy consumption values of a maximum consumption, a minimum consumption, and an average consumption between the maximum consumption and the minimum consumption of the server energy utilization reading;
an executable portion that calculates a global minimum consumption value of a plurality of servers having equal specifications by measuring a minimum observed energy or an average minimum observed energy detected over a plurality of virtual probes monitoring the processing components within each of the plurality of servers;
an executable portion that calculates a global maximum consumption value of the plurality of servers having equal specifications by measuring a maximum observed energy or an average maximum observed energy detected over the plurality of virtual probes monitoring the processing components within each of the plurality of servers;
an executable portion that allocates a new virtual probe by running a power virus on previously allocated ones of the plurality of virtual probes to generate for each an energy consumption key, the energy consumption key used to form a peak and valley chain of detectible energy changes to compare against the energy consumption key of a candidate virtual probe;

an executable portion that, when the energy consumption key of the candidate virtual probe matches the energy consumption key of a previously allocated one of the plurality of virtual probes, releases the candidate virtual probe and creating a waiting time before allocating an alternative candidate virtual probe; and an executable portion that attempts to allocate the new virtual probe until the server energy utilization reading of the statistical significant number of servers is reached.

10. The computer program product of claim 9, wherein the processing components comprise at least portions of processors, processor cores, memory components, internal or external accelerators, and networking components; and further including an executable portion that obtains a total utilization of the datacenter according to the algorithm: (average of all probes (or average energy seen over time by each)−global minimum power calculated from all probed servers)/(global maximum power calculated from all probed servers−global minimum power calculated from all probed servers).

11. The computer program product of claim 9, wherein virtually probing comprises running a process on a Virtual Machine (VM) while reading an energy register of the processing components.

12. The computer program product of claim 9, further including an executable portion that presents the server utilization reading to an operator of the datacenter, whereby the operator uses the server energy utilization reading to adjust at least one of a number of workloads being performed and a number of the processing components allocated to perform respective workloads.

* * * * *